(12) United States Patent
Herrick

(10) Patent No.: US 6,670,920 B1
(45) Date of Patent: Dec. 30, 2003

(54) SYSTEM AND METHOD FOR SINGLE PLATFORM, SYNTHETIC APERTURE GEO-LOCATION OF EMITTERS

(75) Inventor: David L. Herrick, Mont Vernon, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/219,103

(22) Filed: Aug. 15, 2002

(51) Int. Cl.⁷ .............................. G01S 3/16; G01S 5/04
(52) U.S. Cl. .................. 342/378; 342/444; 342/465
(58) Field of Search .............................. 342/465, 423, 342/378, 444, 430

(56) References Cited

U.S. PATENT DOCUMENTS

| | | | | |
|---|---|---|---|---|
| 4,633,261 A | * | 12/1986 | Kosaka et al. | 342/430 |
| 4,754,282 A | * | 6/1988 | Edelblute et al. | 342/417 |
| 5,084,709 A | * | 1/1992 | Baghdady | 342/442 |
| 5,493,308 A | * | 2/1996 | Bingham et al. | 342/442 |

* cited by examiner

*Primary Examiner*—Gregory C Issing
(74) *Attorney, Agent, or Firm*—Daniel J. Long

(57) ABSTRACT

The determination of the geographical location of a signal emitter by the coherent, time integrated measurement of received signal wavefront phase differences through a synthetic aperture and the reconstruction of the wavefront of the received signal. The location of an emitter is determined by coherently measuring the phase gradient of an emitted signal at measurement points across a measurement aperture. Each measured phase gradient is integrated to determine a vector having a direction from the measurement point to the signal emitter and an amplitude proportional to the received signal. A figure of merit is determined for each possible location of the signal emitter by integrating each vector with respect to a propagation path between the measurement point of the vector and the possible location of the signal emitter, and the location of the signal emitter is determined as the possible location of the signal emitter having the highest figure of merit. The measurement aperture is generated by motion of a receiving aperture along the path and the receiving aperture is generated as by synthetic aperture methods. The receiving aperture may be mounted on an airborne platform and a positional towed body.

10 Claims, 13 Drawing Sheets

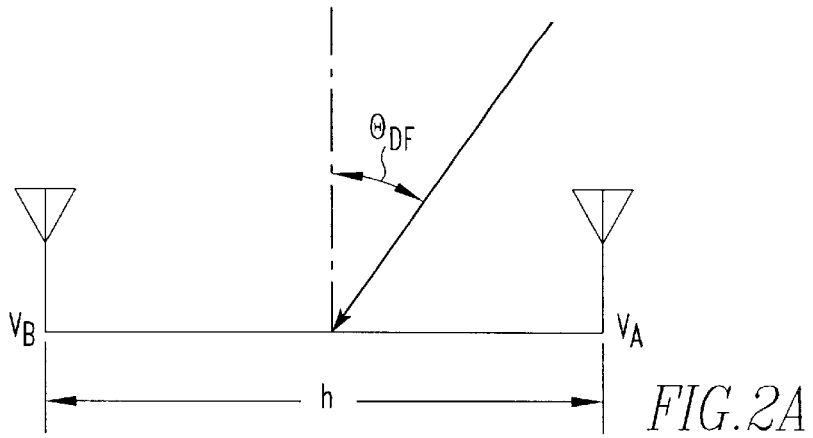

FIG.2A $$\Phi_{MEAS} = \angle V_A - \angle V_B \quad FIG.2B$$

$$\sigma_{\Phi_{MEAS}} = \sqrt{\left(\frac{1}{\sqrt{2SNR}}\right)^2 + \left(\frac{1}{\sqrt{2SNR}}\right)^2} = \frac{1}{\sqrt{SNR}}$$

FIG.2C $$\Phi_{MEAS} = \frac{2\pi h}{\lambda} SIN(\Theta_{DF}) \quad FIG.2D$$

$$SIN(\Theta_{DF}) \approx \Theta_{DF} \quad \text{(BROADSIDE CONDITION)} \quad FIG.2E$$

$$\sigma_{\Phi_{DF}} = \frac{\lambda}{2\pi h} \sigma_{\Phi_{MEAS}} \quad FIG.2F$$

$$\boxed{\sigma_{\Phi_{DF}} = \frac{\lambda}{2\pi h \sqrt{SNR}}} \quad FIG.2G$$

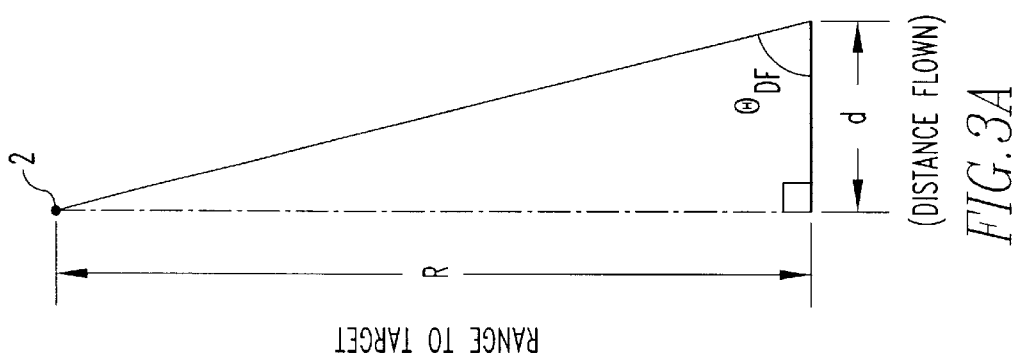

$$\Phi(S) - \Phi(0) = \int_0^S (\tilde{\nabla}\Phi) \cdot \frac{\tilde{V}}{\|\tilde{V}\|} ds$$

FIG.5A $$\nabla \Phi = -\frac{2\pi}{\lambda} \hat{\rho}$$

FIG.5B $$\Phi(S) - \Phi(0) = \frac{2\pi}{\lambda} \int_0^S \hat{\rho} \cdot \frac{\tilde{V}}{\|\tilde{V}\|} ds$$

FIG.5C $$\Omega(P) = \frac{1}{L} \left| \int_0^L a(s) \, r(P.s) \, e^{i\left|\Phi(S) - (2\pi/\lambda)r(P.s)\right|} ds \right|$$

FIG.5D

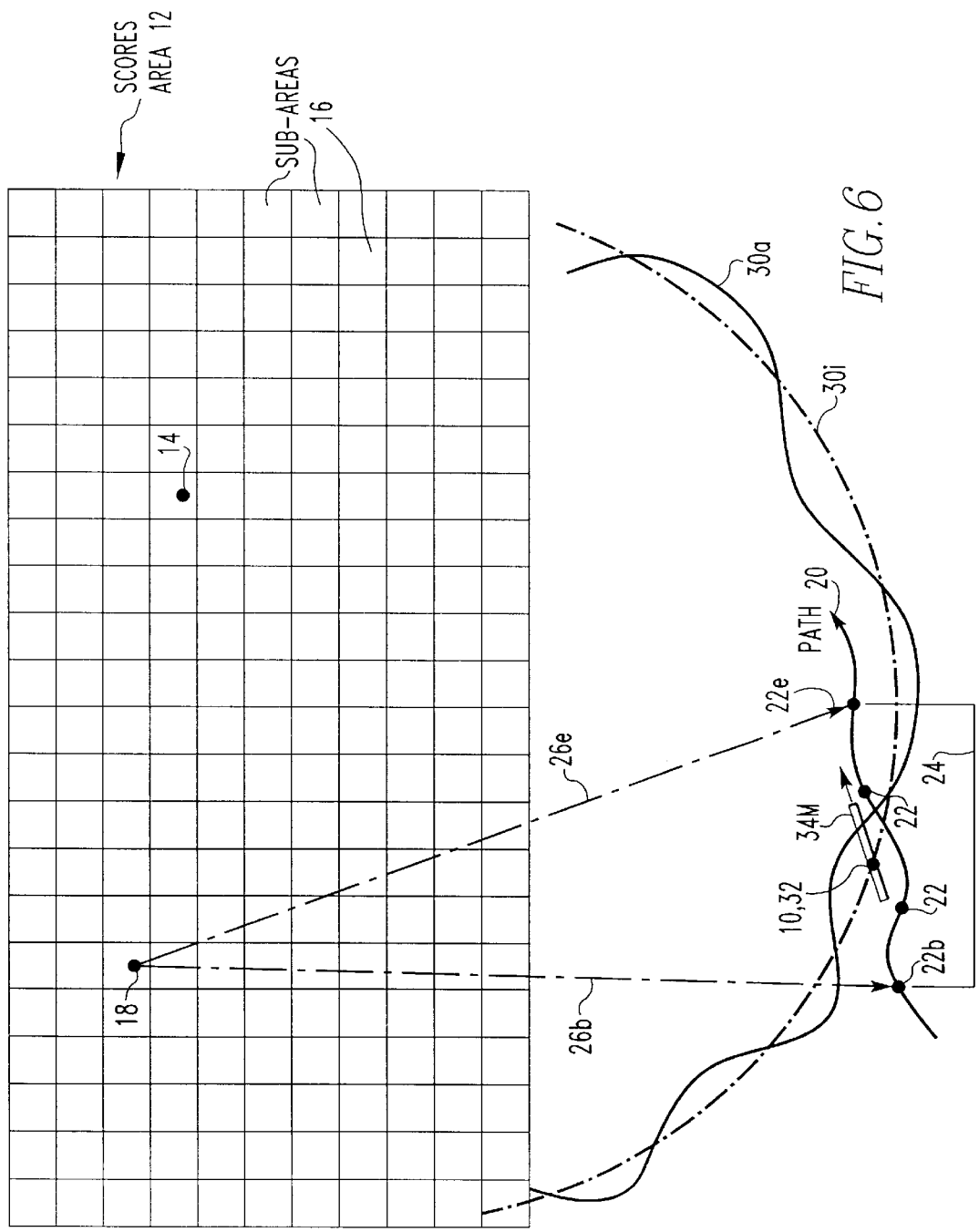

TOWED BODY APERTURE 76

$$\Delta R = \sqrt{R^2 + d^2} - R \quad FIG.10B$$

$$\Delta R = \frac{d^2}{2R} \quad FIG.10C$$

$$\Phi = \frac{2\pi}{\lambda} \Delta R \quad FIG.10D$$

$$R = \frac{\pi d^2}{\lambda \Phi} \quad FIG.10E$$

$$\sigma_{RANGE} = -\frac{\lambda}{\pi h}\left(\frac{R^2}{d^2}\right)\sqrt{\frac{d \cdot h'}{SNR}}$$

- ANTENNA
- DOWNCONVERTER
- POSITION SENSOR

SYSTEM AND METHOD FOR SINGLE PLATFORM, SYNTHETIC APERTURE GEO-LOCATION OF EMITTERS

FIELD OF THE INVENTION

The present invention relates to the determination of the geographical location of a target emitter and, in particular, to the determination of the geographical location of a target emitter by the coherent, time integrated measurement of received signal wavefront phase differences through a synthetic aperture defined by the path of a single mobile receiving platform and the reconstruction of the wavefront of the received signal.

BACKGROUND OF THE INVENTION

There are many circumstances wherein it is necessary or desirable to determine the geographic location of an emitter of electromagnetic radiation, such as a radar system, a communications facility or device or an emergency beacon or transmitter. Typical applications may include, for example, military signal intelligence (SIGINT) and electronic intelligence (ELINT) operations for locating radar or communications facilities, and air, land and sea rescue operations wherein it is necessary to locate an emergency beacon or transmitter, such as used in aircraft and vessels, or communications devices ranging from conventional or emergency radio devices to cell phones.

Such applications and operations are characterized by common requirements that are, in turn, imposed by general, common characteristics of the target emitters to be located and the situations or circumstances under which the target emitters are to be located. For example, the signal transmitted by a target emitter may be of relatively low power, as in the case of emergency beacons or emergency radios, or may be masked, distorted or effectively reduced by terrain or weather conditions, and such conditions may be intentionally imposed in, for example, military or otherwise hostile situations. In addition, the time available or permissible for locating a target emitter may be limited in both military and civil situations, that is, and for example, in military countermeasures operations or in search and rescue operations, and the resources available for target emitter location may be limited.

As such, it is generally necessary or desirable for a system for locating target emitters to be mobile, that is, to be readily transportable into the general geographical location of a target emitter on an aircraft, vehicle or vessel, both to bring the locator system into range of the target emitter and to allow the locator system to search as large an area as possible in the minimum time. It is also desirable that a locator system be transported and employed in and from a single platform, whether an aircraft, vessel or vehicle, as the use of a single platform reduces the system cost, reduces demand on frequently limited resources and allows a greater area or number of areas to be searched when multiple platforms are available. A single platform system also eliminates the complexity and time delays inherent in deploying and coordinating multiple cooperatively operating platforms.

Related problems are that locator system should be capable of determining the geographic location of a target emitter at the greatest possible range, both to reduce the search time and to reduce risk to the locator system in hostile environments, whether due to weather or terrain factors or otherwise hostile factors. The locator system must also be capable of identifying the geographic location of a target emitter with the greatest possible accuracy as insufficient accuracy in locating a target emitter may render countermeasures ineffective in military situations and may unacceptably delay locating or reaching the target emitter in civil situations, such as search and rescue operations, particularly in difficult terrain or weather conditions. In addition, the locator system should be capable of locating as wide a range of target emitter types as possible, and correspondingly over as wide a range of the electromagnetic spectrum as possible, to allow a given locator system to be employed in as wide a range of applications and situations as possible.

The factors and system elements that determine and limit the characteristics and capabilities of an emitter location system, and in particular a single platform, mobile emitter location system, are numerous and inter-related. Two of the primary elements, however, are the receiving element through which target emitter signals are received and the method by which the received signals are used to identify the geographic location of a target emitter.

For example, current methods for single platform emitter location are based upon determining multiple direction finding (DF) bearings, often referred to as DF "cuts", to the target emitter at points along a path traversed by the locator platform, such as the flight path of an aircraft. Each "cut" is a determination the gradient, that is, the directional spatial derivative, of the wavefront of a signal emitted by the target emitter and, in theory, indicates the direction of the emitter relative to the locator platform at the point the "cut" is taken. Successive DF cuts are used to determine a Line of Bearing (LOB) "fan" of DF cuts and the location of the target emitter is taken as the point of intersection of the DF cuts, that is, of the bearings forming the LOB fan. This method has been found to provide reasonable results within certain limitations, but is subject to significant limitations and problems. For example, signal propagation factors between the emitter and the locator system path at various points, such as variations in propagation conditions, local multipath distortions, multiple propagation paths and reflections, will result in significant errors in the measured gradients of the wavefront and this significant errors in the measured bearings between the locator system and the target emitter. In addition, the accuracy of conventional DF/bearing systems is dependent upon the accuracy with which the associated antenna or other signal receiving element can determine a bearing to an emitter, which in turn is dependent upon the characteristics of the antenna, such as the size of the antenna. For such reasons, it has been found that for reasonable and acceptable accuracy the ratio of the distance between target emitter and the locator system and the length of the path traversed by the locator system between bearings must be on the order of 1:1, thereby severely limiting either the accuracy of the method or the range at which locations can be accurately determined, or both.

The limitations of conventional DF methods and basic problems in determining the location of a signal emitter through conventional DF methods may be more clearly understood and illustrated by briefly considering the principles of operation of conventional direction finding methods. Referring therefore to FIG. 1A, a signal emitted by a Signal Source 2 may be viewed as comprised of a series of curved Wavefronts 4 of wavelength λ radiating from the Signal Source 2. It is well known and understood that the Gradients 6 of Wavefronts 4, that is, the spatial derivatives of the Wavefronts 4, will be essentially normal to the Wavefronts 4 at each point along each Wavefront 4 and, under relatively ideal transmission conditions, will thereby point to the Signal Source 2. A conventional direction finding (DF) system accordingly attempts to determine two or more Lines Of Bearing 8 to the Signal Source 2 by determining the Gradients 6 of Wavefronts 4 at two or more points along any Wavefront 4, as illustrated by Gradients 6A, 6B and 6C. Gradients 6A, 6B and 6C then determine corresponding Lines of Bearing 8A, 8B and 8C to the Signal Source 2 and the crossing point of Lines of Bearing 8 in turn identifies the location of Signal Source 2. As illustrated in FIG. 1B, however, more normal non-ideal transmission conditions, such as multi-path affects, distort Wavefronts 4 so that while the Gradients 6 at various points along any of Wavefronts 4 are normal to a Wavefront 4 at each point, the Gradients 6, as illustrated by Gradients 6D and 6E, are erratic and inconsistent with respect to the location of Signal Source 2. As such, the corresponding Lines of Bearing 8 determined at each point will be in error, so that the location of Signal Source 8 as determined by the Lines of Bearing 8 will be in corresponding error, and it is possible that the Lines of Bearing 8 may point in directions far removed from the actual location of Signal Source 2.

The inherent errors and limitations of a conventional DF system in determining a line of bearing to a signal source are illustrated more explicitly in FIGS. 2A–2G, 3A–3E and 4A–4C wherein FIG. 2A represents an exemplary two element receiving array having a receiving aperture width of h and for a signal having a wavelength of $\lambda$. The line of bearing to a Signal Source 2 relative to the aperture of the receiving array is represented by the angle $\theta_{DF}$ relative to a line normal to the midpoint of the axis between the receiving elements. The measured line of bearing to the signal source, $\theta_{MEAS}$, is represented by the expression of FIG. 2B as being determined the phase difference between the signals received at the two elements of the array, that is, $V_A$ and $V_B$, while the error in determining $\theta_{MEAS}$, $\sigma_{\theta MEAS}$, may be expressed as in FIG. 2C wherein SNR is the signal to noise ratio of the received signal at the two elements of the aperture. The relationship between $\theta_{MEAS}$ and $\theta_{DF}$ may be expressed as in FIG. 2D, wherein the term $\sin(\theta_{DF})$ may be expressed as $\theta_{DF}$, as represented in FIG. 2E, for situations wherein the signal source is located effectively broadside to the aperture of the receiving array. The error in determining $\theta_{DF}$ as a function of the error in determining $\theta_{MEAS}$ may then be expressed as in FIG. 2F, and the substitution of the expression for $\theta_{MEAS}$ from FIG. 2C into the expression of FIG. 2F to yield the expression of FIG. 2G for the error, $\sigma_{\theta DF}$, in determining the line of bearing to the signal source relative to the aperture of the receiving array. As may be seen from the expression of FIG. 2G, therefore, the error, $\sigma_{\theta DF}$, in determining the line of bearing to a signal source in a conventional DF system is an inverse linear function of the width of the aperture and of the square root of the signal to noise ratio.

FIG. 3A, in turn, illustrates the geometry of range determination by conventional DF methods for the example discussed above wherein R represents the range between the signal source and a first point at which a line of bearing to the signal source is determined and d represents the distance along a baseline extending between the first line of bearing point and a second point at which a line of bearing to the signal source is determined. It will be noted that in the example illustrated in FIG. 3A it is assumed, for simplicity and clarity of discussion, that the angle between the first line of bearing and the baseline is a right angle while the angle between the second line of bearing point and the baseline is represented by $\theta_{DF}$. As such, the range R between the first line of bearing point and the signal source may be represented by the expression of FIG. 3B and the relationship between R and $\theta_{DF}$ as a function of the length of the DF baseline, d, may be represented by the expression of FIG. 3B. The error $\sigma_P$ in determining a range R between the first line of bearing point and the signal source as a function the error $\sigma_{\theta DF}$ in determining a line of bearing angle between the baseline and the signal source may therefore be represented by the expression of FIG. 3D, which, with the appropriate substations, yields the expression for $\sigma_P$ of FIG. 3E.

It may be seen from the expression of FIG. 3E that the error $\sigma_P$ in determining a range to a signal source using conventional DF methods is again dependent upon the accuracy with which the DF system can resolve an angular line of bearing to the signal source, which is in turn again inversely linearly dependent upon the width of the aperture and inversely dependent upon the square root of the signal to noise ratio. It may also be seen from the expression of FIG. 3E that while the error $\sigma_P$ in determining a range to a signal source is an inverse linear function of the length of the baseline, the error $\sigma_P$ is a direct function of the square of the range between the baseline and the signal source. This dependence of a conventional DF system upon the length of the baseline and the range to the signal source in determining the location of a signal source is illustrated in FIGS. 4A–4C, which illustrate the errors or tolerances in determining the location of a signal source, for range R to baseline length d ratios, R/d, of, respectively, 25 to 1, 5 to 1 and 0.5 to 1.

It will therefore be apparent that the accuracy with which a conventional DF system can determine the location of a signal source is dependent upon the accuracy and resolution with which the system can resolve line of bearing angles to a signal source. As such, significant improvements in the accuracy of determining line of bearing angles in a DF system require a significant increase in the size of the receiving array aperture, an improvement in the signal to noise ratio, maximizing the length of the baseline or minimizing the ratio between range to the signal source and the length of the baseline, and or combination of any or all of these factors. It will also be understood by those of skill in the relevant arts, however, that the signal to noise ratio is largely determined by the received signal and signal propagation conditions, thereby limiting the degree to which the signal to noise ratio may be improved by improvements in the DF system itself. It will also be understood by those of skill in the relevant arts that there are practical limits to the aperture widths that can be achieved, even using synthetic aperture techniques, and to the signal source range to baseline length ratios that can be achieved.

To illustrate the above discussed practical limitations in implementing a conventional DF system, it is frequently desirable or necessary to implement a DF system into a single, mobile platform as it is often not feasible, for economic and physical reasons, for example, to implement DF networks of the required granularity over all areas of interest. The implementation of a locator system into a single, mobile platform, however, conflicts with the requirement to determine accurate bearings to a target emitter, and in particular when the bearings are to be determined over a broad frequency range. For example, a physically large antenna is necessary to provide a sufficiently large baseline receiving aperture for adequate bearing accuracy at lower frequencies, while closely spaced receiving elements are necessary to avoid ambiguities at higher frequencies. These requirements, in turn, result in a physically large antenna of multiple elements that is difficult to implement in a single, mobile platform unless the platform is very large. Although various methods are known to reduce the physical size of an antenna for a given frequency or to match an antenna to a wide range of frequencies, such methods typically increase the cost of the antenna system, allow only a relatively limited range of frequencies, decrease the receiving efficiency and bearing accuracy of the antenna, or are difficult to implement for various reasons. For example, synthetic aperture techniques, which use platform motion to synthesize an apparent aperture larger than the actual physical antenna, may be used to increase the effective size of an antenna. This method, however, has generally been limited to high frequency applications, such as radar, where the path traveled by the platform between the apparent elements is sufficiently short to appear relatively linear.

In summary, therefore, the capability of a conventional DF system to determine the location of a signal source by triangulation of multiple lines of bearing measured from a baseline is primarily dependent upon the accuracy with which the system can determine the angles of the lines of bearing relative to the baseline and the signal source. As described, a conventional DF system determines the angle of a line of bearing relative to the baseline by determining a single factor, that is, the gradient, or spatial derivative, of the wavefront of the signal emitted by the signal source at the point of measurement of the angle of arrival of the signal. In this regard, a conventional DF system may be analogized to a stereoscopic rangefinder comprised of pinhole cameras. As is well known and understood, a pinhole camera has an essentially infinite depth of field and performs the single imaging function of "ray tracing", or projecting, light in a straight line from an image onto a plane. A pinhole camera thereby cannot and does not "focus" an image, but can determine the direction of arrival of a beam or ray of light. As such, two such pinhole cameras separated along a known baseline can operate as a stereoscopic rangefinder to determine the location of a light source by determining angle of arrival of light from the source at each camera, and determining the location of the light source as the intersection point of the beams or rays of light received by the cameras.

Again, however, and because the pinhole cameras use only a single factor or element of information regarding the light emitted by the source, that is, the direction of arrival of the light at each camera, the accuracy of a pinhole stereoscopic rangefinder is determined and limited by the accuracy with which the cameras can determine the angle of arrival of the light. For these reasons, and while a pinhole camera may have an effectively infinite depth of field and a wide angle of image capture, images obtained by a pinhole camera typically lack resolution. As in the instance of a conventional DF system, the accuracy of pinhole cameras in determining the angle of arrival of light from a source is, in turn, determined by such factors as the receiving aperture size, that is, the size of the pinhole. Also, and again as in the instance of a conventional DF system, the accuracy of a pinhole stereoscopic system in locating a light source may be improved by increasing the baseline width between the pinhole cameras.

In conclusion, therefore, the resolution of images captured by a pinhole camera and the location of a signal source by a conventional DF system are similarly limited for the same reason, which is that both systems rely entirely upon a single factor, that is, the capability of the system to determine or resolve the angle of arrival of a signal, or ray of light, at a given point. In the instance of a conventional DF system, however, the problem is further compounded in that under normal non-ideal transmission conditions, such as the presence of multi-path affects, the wavefronts of the signal are distorted so that the gradients of a wavefront at a given location may be erratic and inconsistent with respect to the location of the signal source.

The present invention provides a solution to these and other related problems of the prior art.

SUMMARY OF THE INVENTION

The present invention is directed to a method and system for the determination of the geographical location of a signal emitter by the coherent, time integrated measurement of received signal wavefront phase differences through a synthetic aperture defined by the path of a single mobile receiving platform and the reconstruction of the wavefront of the received signal.

According to the present invention, the geographical location of a signal emitter is determined by coherently measuring a phase gradient of a signal emitted by the signal emitter at a plurality of measurement points across a measurement aperture wherein each phase gradient measurement includes an amplitude and a phase gradient of the received signal at the measurement point. The measured phase gradient is integrated for each measurement point to determine a corresponding vector wherein each vector has a direction from the measurement point to the signal emitter and an amplitude proportional to the received signal at the measurement point. A figure of merit is determined for each possible location of the signal emitter by integrating each vector with respect to a propagation path between the measurement point of the vector and the possible location of the signal emitter, and the location of the signal emitter is determined as the possible location of the signal emitter having the highest figure of merit.

Further according to the present invention, the measurement aperture is generated by motion of a receiving aperture along the path and the phase gradient measurements are taken continuously and incrementally at a sequence of measurement points across the measurement aperture, so that the incremental and continuous line integration of the measured phase gradient of the signal across the measurement aperture allows the effective reconstruction of a wavefront of the signal emitted by the signal emitter wherein the reconstruction of the wavefront including the curvature of the wavefront. Each vector is determined by integration of the phase gradient measurements over a measurement period as the receiving aperture moves along a segment of the path and has a direction from the corresponding segment of the path to the location of the signal emitter, and the figure of merit for each possible location of the signal emitter is in turn determined for each vector by integration of the vector over an arc length of the path segment over which the phase gradient measurements of the vector were taken and with respect to the propagation path between the path segment and the possible location of the signal emitter.

In the presently preferred embodiment of the present invention, the receiving aperture is generated as a synthetic aperture by motion of at least two receiving elements along a segment of the path. In one implementation of the present invention, the receiving elements are mounted on an airborne platform and on a towed body connected to and towed by the airborne platform and positional with respect to the airborne platform.

An emitter location system embodying the present invention includes a receiving aperture and a receiver connected from the receiving aperture for determination of a phase gradient measurement at each of a sequence of measurement points across a measurement aperture. The measurement aperture is defined by motion of the receiving aperture along a path and each phase gradient measurement includes an amplitude of the received signal and a phase gradient of the received signal across the receiving aperture. A position information source provides position information relating to the geographic location of each measurement point, and a vector processor integrates the phase gradient measurement of each measurement point to determine a corresponding vector for each measurement point wherein each vector has a direction from the corresponding measurement point to the signal emitter and an amplitude proportional to the received signal at the measurement point. A location processor determines a propagation path between each measurement point and each of a plurality of possible geographic locations of the signal emitter and determines a figure of merit for each possible geographic location of the signal emitter wherein each figure of merit is determined by integrating each vector with respect to a propagation path between the measurement point of the vector and the possible location of the signal emitter.

DESCRIPTION OF THE DRAWINGS

The foregoing and other objects, features and advantages of the present invention will be apparent from the following description of the invention and embodiments thereof, as illustrated in the accompanying figures, wherein:

FIGS. 2A–2G illustrate the inherent limitations of a conventional DF system in determining the angle of a line of bearing to a signal source;

FIGS. 3A–3E illustrate the inherent limitations of a conventional DF system in determining a range to a signal source;

FIGS. 5A–5D are mathematical expressions illustrating the operation of an emitter location system of the present invention;

FIG. 6 is a general geographic diagram illustrating the operation of an exemplary emitter location system;

FIGS. 10A–F are mathematical expressions illustrating the range determination errors and factors of an emitter location system of the present invention;

DETAILED DESCRIPTION OF THE INVENTION

Figure 1A:
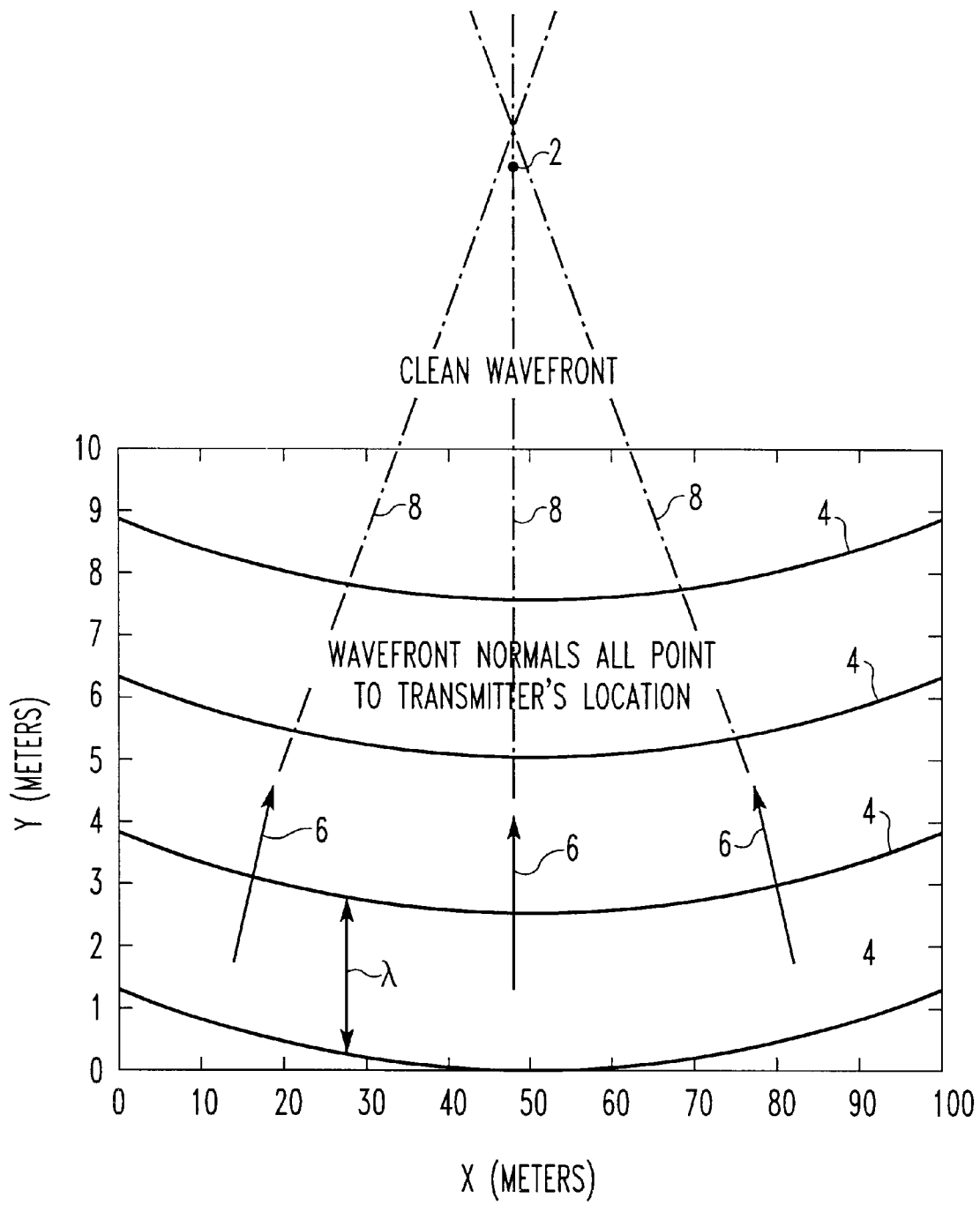
FIGS. 1A and 1B illustrate wavefronts and the gradients of wavefronts emitted by a signal source.

As will be described in the following, the emitter location system of the present invention includes a method for determining the geographical location of the target emitter and a receiving element, or antenna, suitable for use in a single mobile platform and providing increased horizontal and vertical baseline apertures over a significantly increased bandwidth. The method of the present invention for determining the location of a target emitter and the receiving element of the present invention may be employed together in an emitter location system, or may be employed separately. That is, the method for determining the location of a target emitter may be employed in an emitter location system employing a conventional fixed configuration narrow band antenna while the receiving element may be used, for example, in a conventional DF system or communications system to enhance the performance of the system.

A. Detailed Description of an Emitter Location Method and System (FIGS. 1A–D, 2, 3 and 4)

1. Principles of Operation of the Present Invention (FIGS. 5A, 5B, 5C and 5D)

As described herein above, a signal emitted by a signal source may be viewed as comprised of a series of curved wavefronts radiating from the signal source, although the wavefronts will appear planar across the receiving aperture widths normally obtainable. It has also been described that a conventional DF system determines lines of bearing to the signal source by determining a single factor of the signal, that is, the gradient, or spatial derivative, of the wavefront at the receiving aperture at points along a baseline. Under typical conditions, however, such as multi-path distortion, the local gradient of the wavefront may not indicate the true direction to the signal source.

As described in detail in the following, the emitter location method of the present invention coherently measures the phase variation, or gradient, of a narrow-band electromagnetic field, that is, a signal emitted by a target emitter, across a measurement aperture that is defined by the movement of a receiving aperture along a segment of a path. The movement of the receiving aperture along the path thereby defines the measurement aperture, and the measurements are taken continuously and incrementally at a sequence of measurement points across the measurement aperture. Line integration of each measured gradient, or phase variance, across the receiving aperture at a measurement point and during the period of measurement results in a corresponding vector having a direction from the segment of path over which the measurement were taken to the apparent location of the emitter and a length, or amplitude, proportional to the received electromagnetic field. A figure of merit for each possible location of the emitter is determined by integrating each vector over the arc length of the path segment over which the measurements were taken and with respect to a propagation path between the path segment and the possible location of the emitter, wherein the path segment will include at least one measurement aperture and one corresponding vector and may include a plurality of measurement apertures and corresponding vectors. The location system identifies the geographic location having the highest figure of merit as the location of the target emitter.

It may be seen, therefore, that the incremental and continuous line integration of the phase gradient across a measurement aperture, that is, across a path traversed by a receiving aperture, thereby allows the effective reconstruction of the wavefront of the signal emitted by the target emitter, including the curvature of the wavefront. Reconstruction of the wavefront, in turn, allows the determination of vectors from the measurement path to the apparent location of the target emitter, and integration of each vector to each possible location of the target emitter to obtain a relative figure of merit for each possible target emitter location allows the elimination or reduction of multipath effects.

It be recognized that a large measurement aperture is necessary to determine the curvature of a wavefront and the accuracy of the present invention in determining the location of a target emitter is dependent upon the width of the measurement aperture or apertures, rather than upon the length of a line of bearing baseline. In this regard, the generation of the measurement aperture by synthetic aperture techniques, that is, motion of the receiving aperture along a path, allows very large apertures to be readily generated. It should also be noted that measurement of phase differences across a receiving aperture results in the mutual cancellation of all signal characteristics, so that the method is independent of the actual characteristics of the transmitted signal.

The method of the present invention, in contrast to a conventional DF system which has been analogized herein above to a pinhole camera system, may in contrast be analogized to a variable focusing lens rangefinder camera system. As is well understood, a variable focus lens system generates an image from all information across the lens aperture, rather than from a single component as in the case of a pinhole camera. As result, a variable focus lens system thereby provides both a variable depth of field and selectable focus upon any point in the depth of field, and a significantly more sharply focused image than can be achieved with a pinhole type system.

The principle of operation of the location method of the present invention may be considered in further detail with reference to the expressions presented in FIGS. 5A, 5B, 5C and 5D. Referring to FIG. 5A, s is defined as a position along a path traversed by a platform bearing a location system of the present invention wherein s=0 denotes a first point along the path, where the emitter location measurement begins. The phase difference $\Phi(s)-(0)$ of the electromagnetic field of the signal emitted by the emitter between a second point s=s along the path and the initial point s=0 is then given by the expression of FIG. 1A, wherein the vector v denotes the velocity vector of the platform at the second position along the path and $\|v\|$ denotes the length of vector v and wherein the vector v includes a yaw vector of the platform, so that $v/\|v\|$ is a vector of unit length tangent to the path traversed by the platform.

It is known and well understood that for two vectors, such as u and w, the expression u•w denotes their inner, or scalar, product. It is also known and understood that the operation of direction finding is, in principle, the determination of a unit vector $\rho$ directed from the platform bearing the emitter location system and towards the apparent location of the emitter, so that $\rho$ is a unit vector normal to the incident wavefront of the electromagnetic field of the signal emitted by the emitter. The unit vector $\mu$ is represented by the gradient of the phase fronts of the electromagnetic field and the gradient vector $\nabla\Phi$ is expressed in terms of the unit vector $\rho$ by the expression of FIG. 5B wherein $\lambda$ denotes the wavelength of the received signal, or electromagnetic field, and wherein the negative sign generates $-\rho$ as the direction of propagation of the electromagnetic field, which is the reverse of the direction of arrival of the electromagnetic field at the platform bearing the emitter location system.

Figure 1B:
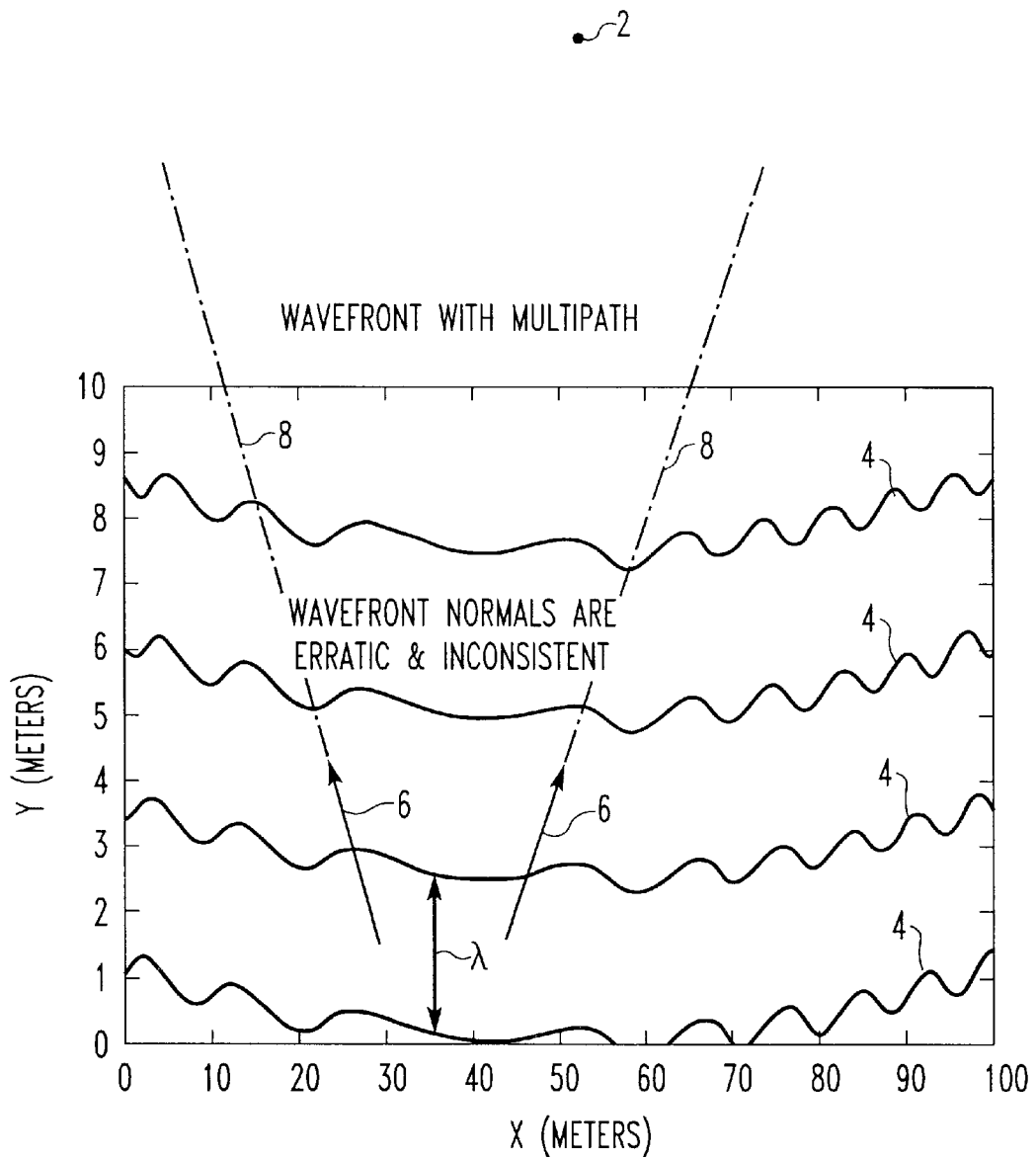
Figure 4A:
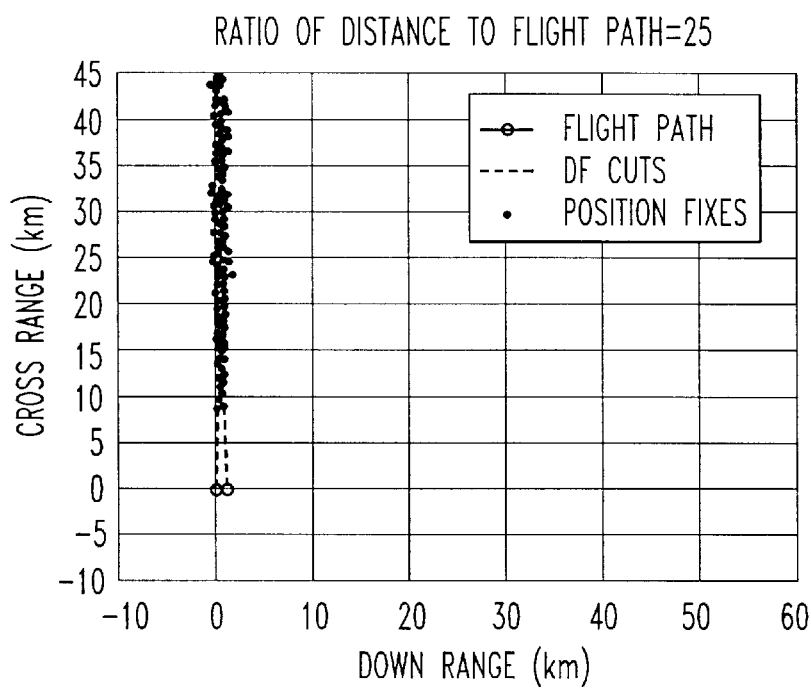
FIGS. 4A, 4B and 4C illustrate the relationship between location of a signal source, the range between the signal source and a DF baseline and the length of a DF baseline.
Figure 4B:
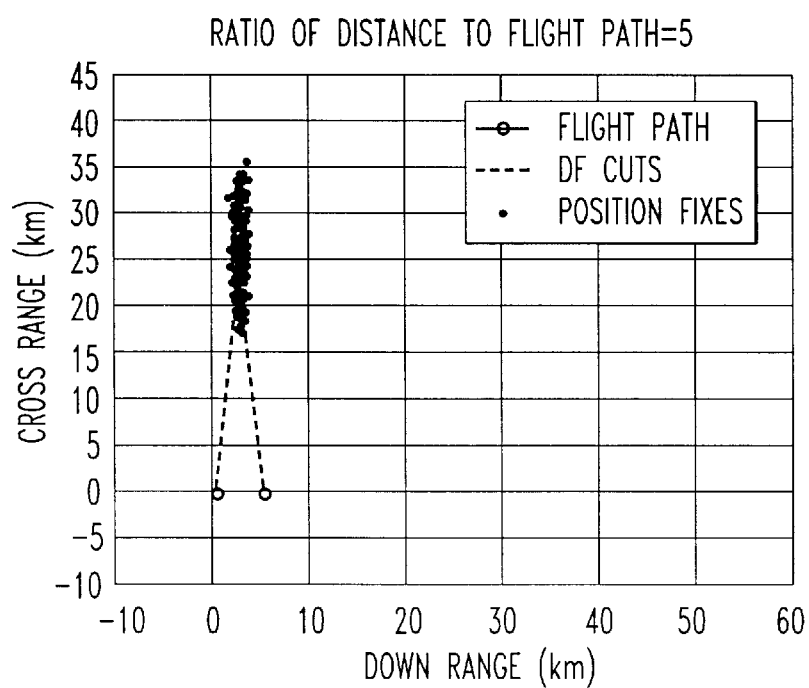
Figure 4C:
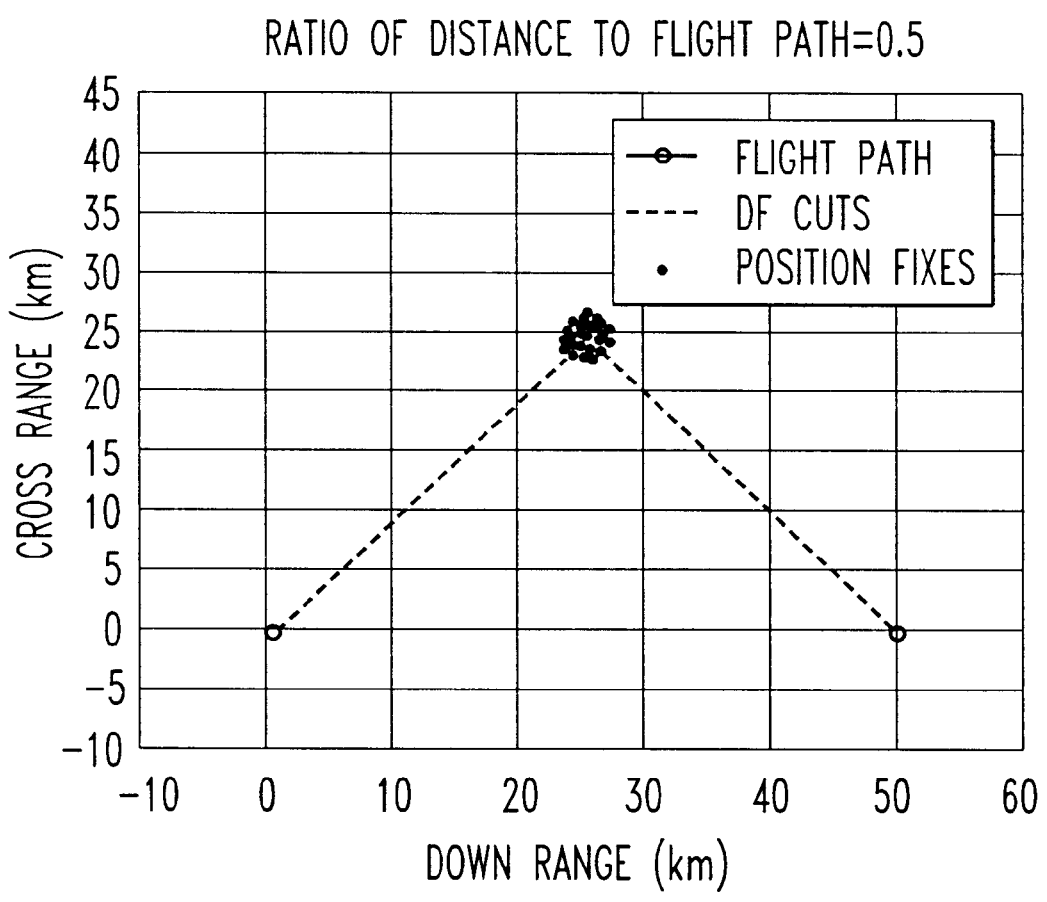

Substituting the expression of FIG. 1B for $\nabla\Phi$ into the expression of FIG. 5A for $\Phi(s)-\Phi(0)$ thereby results in the expression for $\Phi(s)-\Phi(0)$ in terms of $\rho$ and $\lambda$ of FIG. 5C.

It has been described above that the emitter location system of the present invention determines, for each possible location of the target emitter and for each point of the path segment at which the phase has been evaluated, a phasor having a length, or amplitude, proportional to the received electromagnetic field. The system integrates each such phasor along the path segment to determine a figure of merit for each possible location of the target emitter, and identifies the location of the target emitter as the geographic location having the highest figure of merit.

The figure of merit $\Omega(P)$ for each combination of a possible location of the emitter and a point of the path segment at which the phase has been evaluated is determined by means of the expression of FIG. 5D. It will be understood with respect to the expression of FIG. 5D that the propagation path r is dependent upon both the current hypothetical location P of the emitter and the current position s of the platform bearing the emitter location system along the path traversed by the platform, wherein that dependence is denoted by the term r(P,s). The expression G(r(P,s)) denotes a gain term while the term a(s) denotes the amplitude, or received voltage, of the signal received from the emitter when the platform is at position s along the path, and the term L denotes the arc length of the path segment between the first point s=0 and the second point s=s over which the measurements are taken. The multiplication of a(s) by G(r(P,s)), which as described is a function dependent upon the propagation path r as a function of the current hypothetical location P of the emitter and the current position s of the platform operates to remove the effect of propagation loss along the current hypothetical propagation path between the emitter and the platform. Finally, the function $\Phi(s)$ is obtained from the expression of FIG. 1C.

It will be noted from the above discussion that the effect of certain propagation path phenomena that result in significant errors in conventional DF systems are significantly reduced in the method of the present invention. For example, a point of reflection may occur in the field of the emitter at a location removed from the location of the emitter and may result in a field strength from the reflection at a point along the path of the platform that is comparable to the field from the emitter, as in the instance of a radar-target "glint". If the fields from the emitter and from the reflection result in destructive interference at the location along the platform path, the measured direction of arrival of the vector $\rho$ would result in a significant error in a conventional DF system as the vector $\rho$ may point in a direction far removed from both the emitter and the reflection source. In the method of the present invention, however, and as is well known to those of ordinary skill in the relevant arts, the term a(s) would be relatively to very small, and the effect of that error in the vector $\rho$ would not appreciably affect the figure of merit value $\Omega(P)$ determined according to the expression of FIG. 1D, thereby significantly reducing the error in determining the location of the emitter.

It will be further noted, as described further in the following descriptions, that the emitter location method of the present invention does not depend upon direct determination of an angular bearing of a propagation path from the emitter to the receiver as in a conventional direction finding system. The method of the present invention instead determines the relative phases and amplitude of the received signal across an aperture at points along a path segment traversed by the aperture. Because of this, the emitter location method of the present invention is thereby relatively independent of the characteristics of the receiving antenna or elements associated with the location system platform, such as the angular resolution of the receiving antenna.

2. Detailed Description of the Emitter Location Method and System (FIGS. 6 and 7 and 8)

Figure 7:
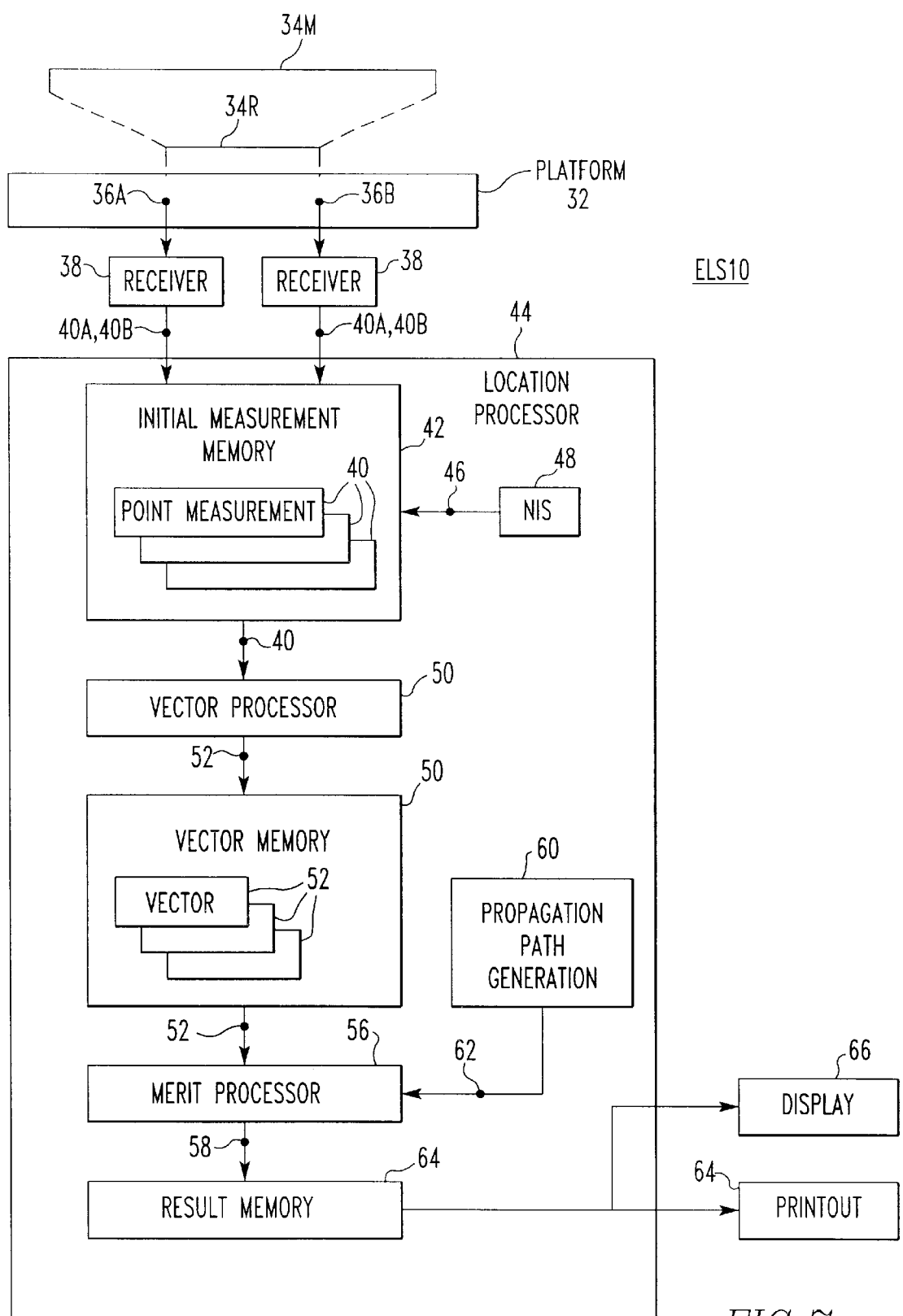
FIG. 7 is a block diagram of an emitter location system.
Figure 8:
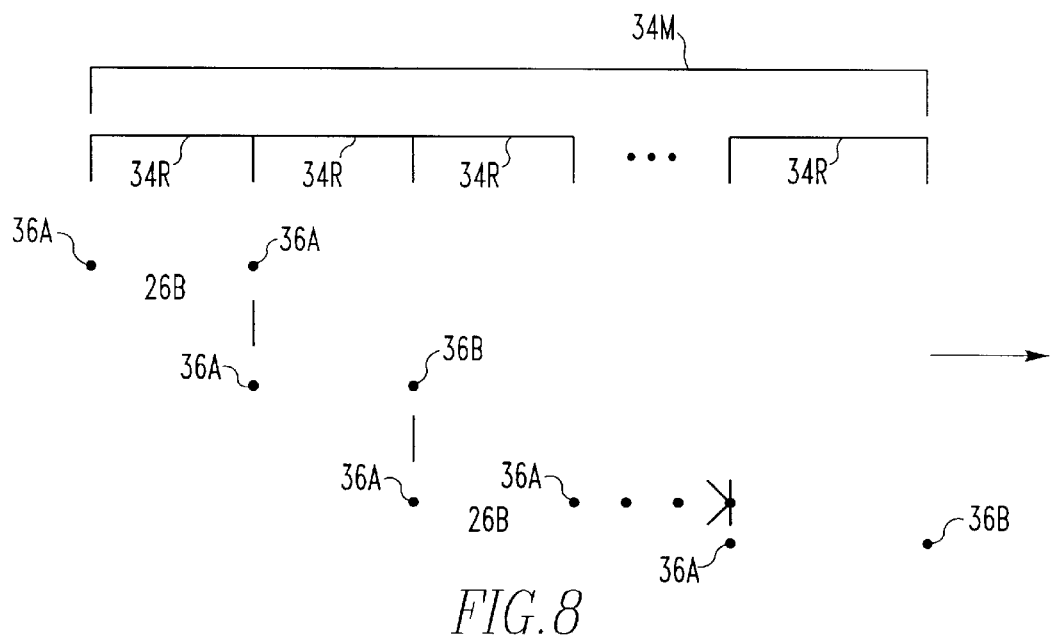
FIG. 8 is an illustrative diagram of the generation of a synthetic aperture.

Referring to FIGS. 6, 7 and 8, therein are presented a general geographic diagram illustrating the operation of an exemplary Emitter Location System (ELS) 10 of the present invention, a block diagram of an Emitter Location System (ELS) 10 of the present invention, and a diagram illustrating the synthesis of a receiving aperture by the motion of the platform bearing the Emitter Location System (ELS) 10.

As represented in FIG. 6, a Search Area 12 enclosing and containing the suspected location of an Emitter 14 is defined and is partitioned into Sub-Areas 16 wherein, for purposes of the following discussions, it is assumed that an Emitter 14 is located in one of Sub-Areas 16. It will be recognized that the minimum dimensions of each Sub-Area 16 are determined by the resolution of the Emitter Location System (ELS) 10, and that larger Sub-Areas 16 may be defined if so desired. It will also be recognized that the location and dimensions of a Search Area 12 may be selected based upon a number of criteria and in a number of ways, such as conventional DF location methods, probabilistic methods based upon other types of information, or arbitrarily.

Also represented in FIG. 6, again for purposes of the following discussions, are a hypothesized emitter Location 18, that is, a Sub-Area 16 which is a possible location of an Emitter 14, and a Path 20 traversed by a platform bearing an Emitter Location System (ELS) 10 of the present invention. Beginning and Ending Measurement Points S 22$b$ and S 22$e$ along Path 20 delineate a Segment 24 of Path 20 over which the phase variance, or gradient, measurements are taken and there will typically be a plurality of incrementally positioned Measurement Points S 22 along Path 20 in Segment 24, including Beginning and Ending Measurement Points S 22$b$ and S 22$e$. As represented in FIG. 2, the Emitter Location System (ELS) 10 is mounted on a Platform 32, such as an aircraft, vehicle or vessel, and provides a Measurement Aperture 34M across which the phase variation, or gradient, of the received signal is measured as the Platform 32 moves along Path 20 between Beginning and Ending Measurement Points S 22$b$ and S 22$e$ of a Segment 24.

Also represented in FIG. 6 are hypothesized Propagation Paths r 26$b$ and r 26$e$ represent the propagation paths from hypothesized emitter Location 18 to Beginning and Ending Measurement Points S 22$b$ and S 22$e$. Also illustrated are a theoretically ideal electromagnetic Wavefront 30$i$ as might be emitted by an Emitter 14 at hypothesized emitter Location 18, and a representation of an actual electromagnetic Wavefront 30$a$ as might be emitted by an Emitter 14 at hypothesized emitter Location 18 but subject to variations in propagation conditions, local multipath distortions, multiple propagation paths and reflections.

It will be understood, and will be apparent from the following discussions, that the relationship of Path 20 to Search Area 12 is arbitrary, that is, any geometry and location of Path 20 is permissible so long as the signal emitted by an Emitter 14 may be received at the Measurement Points 22 along the Path 20. It is also generally preferable that the Path 20 not pass directly over or be directed directly towards a Sub-Area 16 suspected of containing an Emitter 14 as the vectors determined from the phase measurements would lie directly along Path 20 and thus at right angles to the measuring aperture.

Next considering Receiving Aperture 34R and Measurement Aperture 34M in further detail, and referring to FIG. 7, an exemplary implementation of an Emitter Location System (ELS) 10 is illustrated therein as including a Receiving Aperture 34R comprised of two Receiving Elements 36, indicated as Receiving Elements 36A and 36B, although a different number of Receiving Elements 36 may be employed as desired. Receiving Elements 36 are typically arranged longitudinally separated along Platform 32 and thereby to be longitudinally separated along the Path 20 traversed by Platform 32. As illustrated in FIG. 8, and as will be understood by those of skill in the relevant arts, the motion of Platform 32 along a Path 20 and the resulting motion of Receiving Elements 36 along Path 20 allows the generation of a Synthetic Receiving Aperture 34S having an effective aperture size greater than that of the Receiving Aperture 34 defined by Receiving Elements 36. As such, a Receiving Aperture 34R may be comprised of, or generated by, the Receiving Aperture 34R defined by Receiving Elements 36 or may be generated as a Synthetic Receiving Aperture 34S through synthetic aperture techniques using Receiving Elements 36 and the motion of Platform 32 along Path 20. In this regard, it will be understood by those of ordinary skill in the art that the effective size of a Synthetic Receiving Aperture 34S will depend upon the length of the path traversed by the Receiving Aperture 34R defined by Receiving Elements 36 through successive Measurement Points S 22 along the Path 20. It will also be understood that synthetic aperture techniques may be used to synthesize a single, large Synthetic Receiving Aperture 34S, a succession of smaller Synthetic Receiving Apertures 34S along Path 20, or a succession of overlapping Synthetic Receiving Apertures 34S along Path 20. In addition, It will be further understood that the "chaining" of Receiving Apertures 34R at successive Measurement Points S 22 along the Path 20 to generate a Synthetic Receiving Aperture 34S will be accomplished by appropriate combining of the signals received by Receiving Elements 36 at each Measurement Point S 22. A Measurement Aperture 34M, in turn and as described, is defined by and generated by the motion of a Receiving Aperture 34R along a Path 20 and may be defined and generated by the motion of one or more Receiving Apertures 34R or of one or more Synthetic Receiving Aperture 34S along the Path 20.

Next considering the elements and operation of the exemplary Emitter Location System (ELS) 10 illustrated in FIG. 7, the Receiving Elements 36 of Receiving Aperture 34R, which may be comprised, for example, of antennas, are each connected to a corresponding Narrow-Band Receiver 38. The outputs of each of Narrow-Band Receivers 38 at each Measurement Point S 22 will represent the amplitudes of the electromagnetic field wavefronts received by the Receiving Elements 36, that is, the signal emitted by an Emitter 14. A comparison, or subtraction, of the signals received by Receiving Elements 36 and provided as outputs of Narrow-Band Receivers 38 will, in turn, provide phase and amplitude information representing the phase variation, or gradient, of the wavefront across Receiving Aperture 34R at each Measurement Point S 22. In this regard, it should be noted that the subtraction and integration of the signals received through Receiving Elements 36 at each Measurement Point S 22 to determine the phase variance between the signals received by the Receiving Elements 36 will cancel any modulation signal present in the signal.

As Platform 32 traverses a Segment 24 of Path 20, a Point Measurement 40 will thereby be determined at each Measurement Point S 22 and may be stored in an Initial Measurement Memory 42 of a Location Processor 44. As described, each Point Measurement 40 will include Amplitude 40A and Phase 40B information derived from the signals received through Receiving Elements 36 and Narrow-Band Receivers 38 at the Measurement Point S 22 wherein the Amplitude 40A and Phase 40B information represents the phase variation, or gradient, of the wavefront at the Measurement Point S 22. It will be understood that each Point Measurement 40 may be comprised of one or more Amplitude 40A and Phase 40B measurements taken over a measurement period at the corresponding Measurement Point S 22. For example, in the instance wherein Receiving Aperture 34R is generated as a Synthetic Receiving Aperture 34S by motion of Receiving Elements 36 along a part of Path 20, a Point Measurement 40 will typically include a plurality of Amplitude 40A and Phase 40B measurements taken across Receiving Elements 36 during the period during which the movement of Receiving Elements 36 generates the Synthetic Receiving Aperture 34S.

As indicated in FIG. 3, each Point Measurement 40 will also include corresponding Position Information 46 received from Navigational Information Source (NIS) 48 and representing the location of Platform 32 along Path 20, that is, the location of the corresponding Measurement Point S 22. This process is performed for each successive Measurement Point 22 S between Beginning and Ending Measurement Points S 22b and S 22e along the Segment 24, including Beginning and Ending Measurement Points S 22b and S 22e, and may be repeated for successive Segments 24. It this regard, it must be noted that, as described elsewhere herein, Point Measurements 40 are taken incrementally and continuously along Path 20 between Beginning and Ending Measurement Points S 22b, that is, across Measurement Aperture 34M.

The Point Measurement 40 for each Measurement Point S 22 is read from Initial Measurement Memory 42 and provided to a Vector Processor 50 wherein the information comprising each Point Measurement 40 is determined by the manner by which the Receiving Aperture 34R is generated. As described, and for example, Receiving Aperture 34R may be comprised of Receiving Elements 36 or more usually will be generated as a Synthetic Receiving Aperture 34S.

As described herein above, Vector Processor 50 integrates the Amplitude 40A and Phase 40B information of each Point Measurement 40 over measurement period for the Point Measurement 40 to generate a corresponding Vector 52 and stores the Vector 52 and the corresponding Position Information 46 of the corresponding Measurement Point S 22 in a Vector Memory 54. As described, each Vector 52 has a direction from the Segment 24 over which the measurements were taken to the apparent location of the Emitter 14 and a length proportional to the amplitude of the received signal. In this regard, it must be noted that the line integration of phase variances to obtain a Vector 52 significantly reduces or eliminates the effects of multipath signals and the measurement uncertainties inherent in the DF techniques of the prior art.

A Location Processor 56 then reads Vectors 52 and the associated Position Information 46 for the Vectors 52 from Vector Memory 54 and generates a Figure of Merit 58 for each possible location of the Emitter 14 in Search Area 12, that is, for each Sub-Area 16. As described, each Figure of Merit 58 is a numeric value indicating the probability that the Emitter 14 is located in the corresponding Sub-Area 16 and is determined by integrating the Vector 52 over the arc length of the Segment 24 and with respect to a Propagation Path r 26 between the Segment 24 and a corresponding Sub-Area 16 in which the Emitter 14 may located, in accordance with the expression of FIG. 1D. Examples of such Propagation Paths r 26 and a corresponding Sub-Area 16 containing are illustrated in FIG. 2 by hypothesized emitter Location 18 by corresponding Propagation Paths r 26b and 26e. The Vectors 52 is, as described, stored in Vector Memory 54 and the arc length L of the Segment 24 may be determined from the Position Information 46 stored in Vector Memory 54 with the Vector 52.

It is necessary to determine a Propagation Path r 26 length between the Segment 24 and a corresponding Sub-Area 16 for each Sub-Area 16 for which a Figure of Merit 58 is to be determined. This is indicated in FIG. 7 by Propagation Path Generator 60, which is associated with Location Processor 56 and which provides to Location Processor 56 a Propagation Path Length 62 for each Sub-Area 16 for which is Figure of Merit 58 is to be determined. It will be understood by those of ordinary skill in the relevant arts that Propagation Path Generator 60 may be implemented in a number of ways, depending, for example, the implementation of the Emitter Location System (ELS) 10 and the circumstances in which the search for an Emitter 14 is being performed. For example, Propagation Path Generator 60 may store a map of the coordinates of each Sub-Area 16 in Search Area 12 wherein the coordinates of each Sub-Area 16 are defined in any preferred or desired frame of reference, such as geographical map coordinates or coordinates relative to an selected reference point. In this implementation, therefore, the Propagation Path Length 62 of each Propagation Path r 26 may be determined from the corresponding coordinate stored in Propagation Path Generator 60 and the Position Information 46 associated with the Vector 52 or Vectors 52 for which a Figure of Merit 58 is to be determined. In other implementations, and for example, the locations of Sub-Areas 16 may be generated relative to the Segment 24 by calculation of the length and direction of a Propagation Path r 26 from the Segment 24 to each Sub-Area 16.

Figure 9:
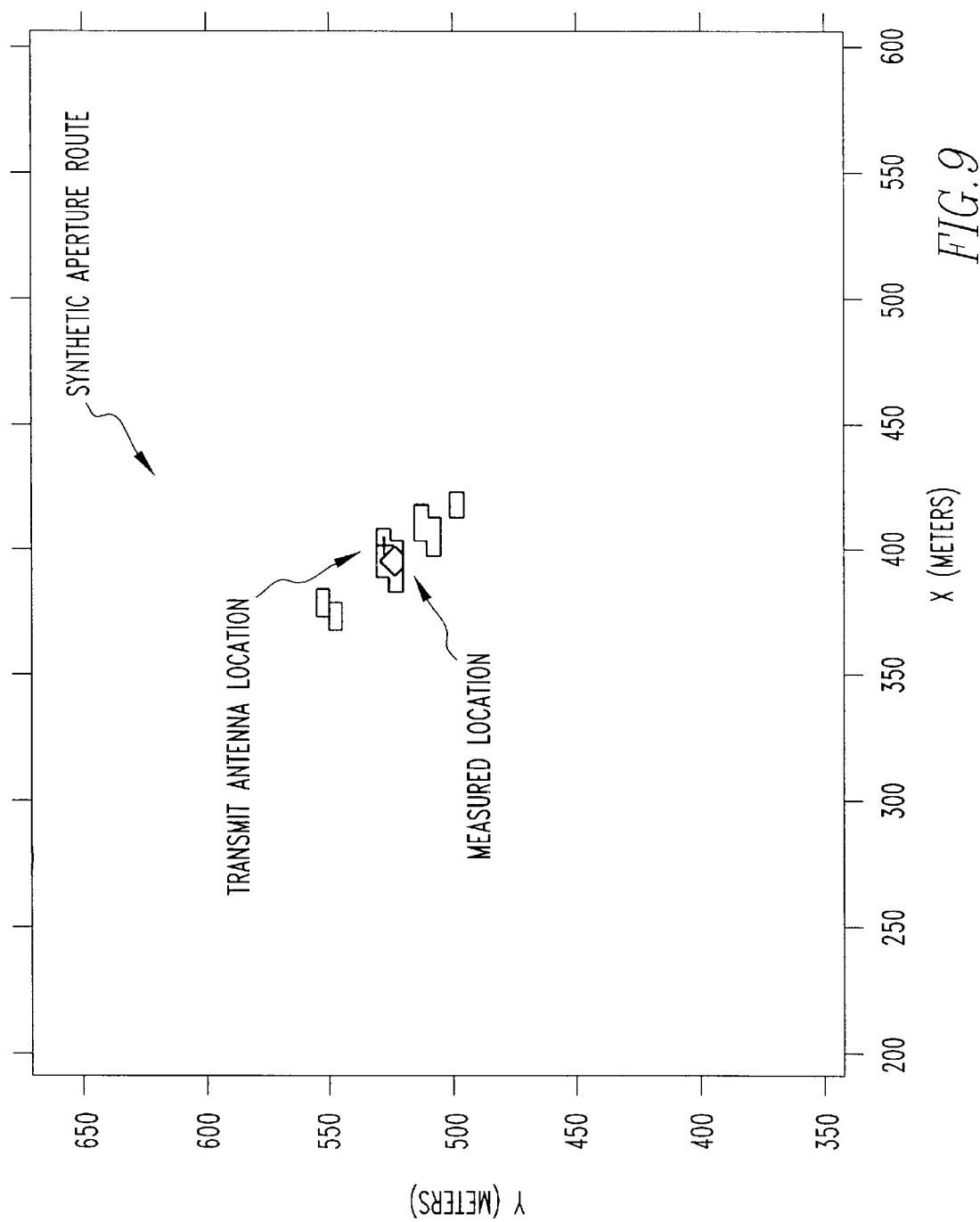
FIG. 9 is an illustrative plot of the location of a target emitter by an emitter location system of the present invention.
Figures 10A, 10F:
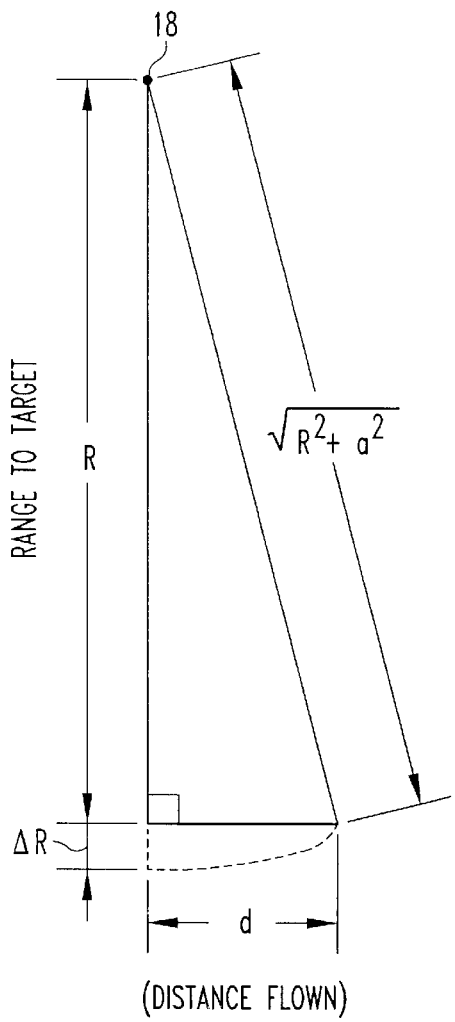

The Figures of Merit 58 determined by Location Processor 56 for each Sub-Area 16 may then be stored in a Result Memory 64 for presentation to a user of the Emitter Location System (ERLS) 10 through a Display 66 or a Print-Out Device 68 to allow the user to identify the Sub-Area 16 most probably containing the Emitter 16 by examination of the Figures of Merit 58. Alternately, the Emitter Location System (ELS) 10 may read the Figures of Merit 58 stored in Result Memory 64 and identify the Sub-Area 16 most probably containing the Emitter 14, or a group of Sub-Areas 16 most probably containing the Emitter 14, or the Figures of Merit 58 may be communicated to another user or facility as desired. For purposes of illustration, an example of a plot of Figures of Merit 58 for an exemplary test of an Emitter Location System (ERLS) 10 of the present invention is shown in FIG. 9. FIG. 9 is a plot of pixel values representing Figures of Merit 58 over a Search Area 12 and indicates both the actual and measured locations of an Emitter 14 and a Path 20 traversed by a Measurement Aperture 34M comprised of a Synthetic Receiving Aperture 34S.

In this regard, it will be apparent to those of ordinary skill in the relevant arts that the method of the present invention, wherein phase difference information is captured across a measurement aperture and processed to reconstruct the wavefront of the transmitted signal, including the curvature of the wavefront, may be executed in the same manner for a three dimensional Search Area 12, that is, for a search volume. Therefore, and while FIG. 9 illustrates a two dimensional plot of Figures of Merit 58, the functions and operations of Receiving Aperture 34R, Vector Processor 50, Location Processor 56 and Propagation Path Generator 60 may be executed in and for three dimensions and the resulting Figures of Merit 58 will identify possible transmitter locations in three dimensions. It will be appreciated that this capability is advantageous in instances, for example, of target emitters located in cities or hilly or mountainous terrain.

Next considering the accuracy of an emitter location system of the present invention in determining the range to a target emitter in the same manner as the accuracy of a conventional DF system was evaluated in FIGS. 3A–3E, FIG. 10 illustrates an example of the geometry of range determination with an emitter location system of the present invention. As indicated therein, a Measurement Aperture 34M traverses a Path 20 from a point at a range R+ΔR from the target transmitter and ending at a second point located at a distance d along a line normal to the line between the first point and the location of the target transmitter. The range between the second point and the target transmitter may be thereby expressed as $[R^2+d^2]^{1/2}$ and the distance ΔR may be represented by the expression of FIG. 10B and, for R>>d, the expression of FIG. 10B may be simplified to the expression represented in FIG. 10C. As described herein above, an emitter location system of the present invention determines differences in range as differences in phase of the received signal, so that the relationship between the measured phase φ of the received signal and a difference in range, that is, ΔR, may be expressed as in FIG. 10D. Substituting the expression of FIG. 10C into the expression of FIG. 10D thereby yields a relationship between range R and phase φ as expressed in FIG. 10E. Differentiating the expression for range R of FIG. 10E, in turn, yields an expression for range accuracy $\phi_{Range}$ as represented in FIG. 10F.

Referring to the equivalent expression for a conventional DF system as represented in FIG. 3E, it was seen that in a conventional DF system the range error in a conventional DF system is linearly dependent upon the square of the range R but is inversely dependent upon only the first power of the baseline width d. The equivalent expression of FIG. 10F for an emitter location system of the present invention, however, shows that while the range error in an emitter location system of the present invention is again linearly dependent upon the square of the range R, it is inversely dependent upon the square, or second power, of the width of the measurement aperture. As described previously, the use of synthetic aperture techniques allows the generation of very large measurement apertures, thereby allowing significant enhancements in the accuracy with an emitter location system of the present invention can determine the range to and location of a target emitter.

Further in this regard, it should be noted that, as will be understood by those of ordinary skill in the relevant arts, the accuracy of an emitter location system of the present invention is enhanced wherein the target emitter, that is, Search Area 12, is located within the near field of the measurement aperture. In this respect, the near field may be defined as those locations within a distance less than $2d^2/\lambda$ wherein d is the length of the path traversed by the receiving aperture, that is, the width of the measurement aperture, and λ is the wavelength of the signal transmitted by the target emitter. For example, in the instance of a 900 MHz signal and a path length of 2 km, the radius of the near field of the measurement aperture is approximately 24,000 km, so that it will be apparent that very extensive Search Areas 12 may be covered within the near field of relatively short paths.

In summary, it will be apparent from the above descriptions that the emitter location method of the present invention is relatively independent of the characteristics of Receiving Elements 36, such as the angular resolution of Receiving Elements 36, and that Receiving Elements 36 may be, for example, omni-directional elements. It will also be apparent that the angular resolution and frequency range of the emitter location system of the present invention is primarily dependent upon the width of the Measurement Aperture 34M, and that the width of Measurement Aperture 34M may be increased by increasing the separation of the Receiving Elements 36 and readily increased by the use of synthetic aperture techniques to increase the effective width of Measurement Aperture 34M.

It will also be seen that the majority of processing operations performed by a Processing Unit 40 are sequential, that is, are performed with respect to one phase variance measurement or vector at a time and, as such, may be pipelined so that the results of a search for an Emitter 14 may be presented virtually in "real time" and essentially immediately.

It will be apparent from the preceding discussions that the implementations of Receiving Aperture 34, Receiving Elements 36, Narrow-Band Receivers 38 and Processing Unit 40 will depend upon the particular implementation of the Emitter Location System 10, but may be implemented in a number of ways. For example, the implementation of Receiving Aperture 34 will depend, for example, on the nature of Platform 32 and the accuracy and bandwidth desired for locating Emitters 14, as well as other factors, certain of which will be discussed in the following. In further example, an Emitter Location System 10 may comprise a complete, self-contained unit that includes all of the elements necessary to determine the location of an Emitter 14, such as the exemplary system described herein for purposes of the present discussions. In other implementations, however, the portion of the Emitter Location System 10 mounted on the Platform 32 may include only the data gathering and storage elements of the Emitter Location System 10 and the processing and positioning determining elements may be located separately, such as at a base or data processing facility. If, for example, the Platform 32 is a remotely controlled drone, the measurement and position information may be transmitted to a base or control facility in real time, that is, as it is obtained, or communicated in "batches" at suitable intervals. In further example, and depending upon the implementation of the Emitter Location System (ELS) 10, Navigational Information Source (NIS) 42 may be a clock provide a time "mark" at each measurement point, with the position of Platform 32 being subsequently determined from other navigational sources, or an inertial navigation system, a geographical positioning unit, or other device or system capable of providing the necessary position information.

3. Examples of Experimental Results

Experiments with an Emitter Location System (ELS) 10 of the present invention have shown that the system was capable of locating an emitter to within an area of 0.89 km by 0.05 km at a range of 32 km using a 200 meter segment, or baseline, of a 450 meter path, for a range to baseline ratio of 70:1, and a physical receiving aperture comprised to two antennas separated by approximately 1 meter. Extrapolation to a 2 km segment, or baseline, predicts that the system would locate an emitter to within 30 meters at a range of 30 km, for a range to baseline ratio of 15:1. By comparison, a conventional DF systems require a range to baseline ration on the order of 1:1 and, at a range of 30 km, would have a an RMS range error of greater than 1 km.

B. Description of a Towed Body Aperture (FIG. 11)

It has been described above that the emitter location method of the present invention is relatively independent of the characteristics of the individual Receiving Elements 36, such as the angular resolution of Receiving Elements 36, and that Receiving Elements 36 may be, for example, omni-directional elements. It has also been described, and may be seen from the above discussions, that the angular resolution and frequency range of the emitter location system of the present invention is primarily dependent upon the baseline length of the Measurement Aperture 34M. As discussed, the baseline length of Measurement Aperture 34M, and thereby the angular resolution and frequency range of Measurement Aperture 34M, may be increased by increasing the separation of the Receiving Elements 36 or by use of synthetic aperture techniques.

Figure 11:
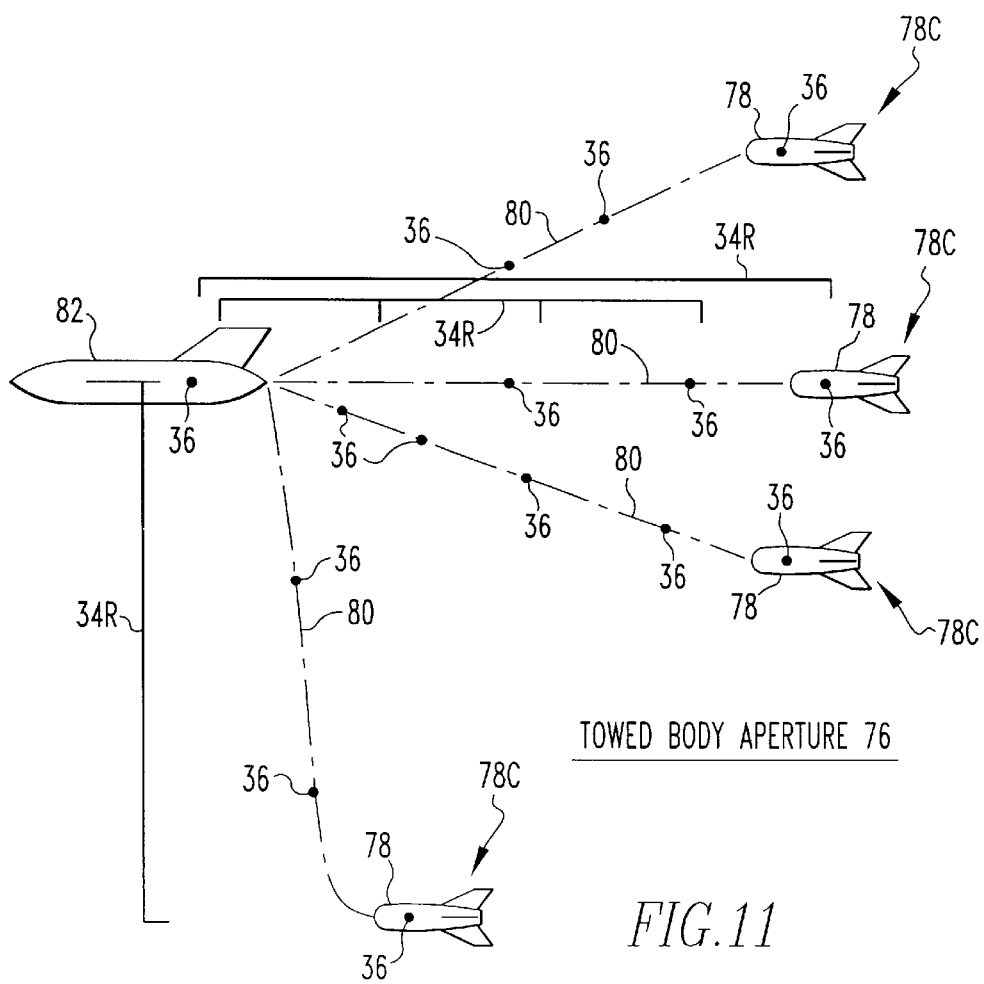
FIG. 11 is a diagram of a towed body aperture.

As illustrated in FIG. 11, a Towed Body Aperture 76 of the present invention provides a Receiving Aperture 36 suitable for use in a single airborne platform, such as an piloted aircraft, drone or other form of airborne platform. As will be discussed in the following, a Towed Body Aperture 76 of the present invention provides increased separation between the Receiving Elements 36 of the aperture and allows the Receiving Elements 36 to be positioned vertically relative to one another, thereby providing increased horizontal and vertical baseline apertures over a significantly increased bandwidth. It will be understood that the Towed Body Receiving Aperture 34TB of the present invention may be utilized with synthetic aperture techniques to provide a still larger aperture baseline, as described above, and may also be employed in a conventional DF system or communications system to enhance the performance of the system.

As represented in FIG. 11, a Towed Body Aperture 76 of the present invention includes a Towed Body 78 having suitable towed flight characteristics, discussed further below, and a Tow Element 80 connecting Towed Body 78 with an airborne Platform 82. One or more Receiving Elements 36 will typically be mounted on Towed Body 76 while one or more other Receiving Elements 36 may be mounted, for example, on Platform 82 or along Tow Element 80. It will be understood that each pair of Receiving Elements 36 of the Towed Body Aperture 76 may be used to define a corresponding Receiving Aperture 34R. For example, a Receiving Aperture 34R will typically be formed by a Receiving Element 36 mounted on Platform 82 or along Tow Element 80 towards Platform 82 and a second Receiving Element 36 mounted on Towed Body 78 or along Tow Element 80 towards Towed Body 78.

Although not shown explicitly in FIG. 11, it will be understood by those of ordinary skill in the relevant arts that a Towed Body Aperture 76 of the present invention will include additional components or elements, the nature specific form of which will depend upon the specific implementation of the Towed Body Aperture 76. For example, in many implementations Platform 82 will include a mechanism for deployment and retrieval of Towed Body 78 and Tow Element 80, and an Emitter Location System (ELS) 10 or conventional DF system and that a position locating device or system may be mounted in the Platform 82 or in the Towed Body 78.

In a further example, Tow Element 80 may include conductive links, that is, wires, connecting Receiving Elements 36 mounted on Towed Body 78 or along Tow Element 80 to a system, such as an Emitter Location System (ELS) 10 or conventional DF system residing in Platform 82. In an implementation having, for example, a single Receiving Element 36 mounted on Towed Body 78 and one or more Receiving Elements 36 mounted on Platform 82, Tow Element 80 may serve both as the mechanical connecting link to Towed Body 78 and as the conductive link between the Receiving Element 36 mounted on Towed Body 78 and a system in Platform 82. In yet another implementation, Towed Body Aperture 76 may be implemented as a self-contained phase measurement data collection system deployed, for example, from a canister or similar housing mounted under a wing or the body of, for example, an aircraft or drone. In this instance, and for example, the Receiving Elements 36 may be mounted on the Towed Body 78 and the canister. The canister or the Towed Body 78 may include narrow-band receivers connected to the Receiving Elements 36, a power source, such as a propeller driven generator, a position locating device or system, a data memory and a telemetry link to collect and communicate the measurement data to, for example, the Platform 82 or to a remote data collection facility. In a further implementation of a canister system, and in consideration of the brief period and shortness of the Path 20 required to obtain the phase variance data required to determine the location of an Emitter 14 with the Emitter Location System 10 of the present invention, the canister may itself be a one use, disposable, self-propelled Platform 82, such as a solid fuel carrier projectile. In yet further implementations, one or more subsidiary Towed Bodies 78 may be deployed from the Towed Body 78, each of which may mount one or more Receiving Elements 36 with appropriate signal connections.

As illustrated in FIG. 11, and assuming for purposes of illustration and discussion that a Receiving Aperture 34R is comprised of Receiving Elements 36 mounted on the Towed Body 78 and the Platform 82, it may be seen that the baseline length of the resulting Receiving Aperture 34R and the orientation of the Receiving Aperture 34R are determined by the position of the Towed Body 78 relative to the Platform 82. As represented in FIG. 11, for example, a Towed Body 78 may be positioned directly behind the Platform 82, to either side of the Platform 82, in a position vertically displaced relative to Platform 82, or in any intermediate position.

It will be understood that the position of Towed Body 34R relative to Platform 82 is determined, in turn and for example, by such factors as the length of Tow Element 80 and the speed of Platform 82 and by Control Surfaces 78C of Towed Body 78. In certain implementations of a Towed Body Aperture 76, Control Surfaces 78C will be fixed, or selectable before deployment of the Towed Body 78, so that the position of the Towed Body 78 relative to the Platform 82, and thus position and orientation of Receiving Aperture 34R, will be predetermined. In other implementations, however, Control Surfaces 78C may be controllable, for example, by signals from the Platform 82, so that the position and orientation of Receiving Aperture 34R may be dynamically controlled. In addition to allowing adjustment of the Receiving Aperture 34R during flight, the use of controllable Control Surfaces 78C may allow, for example, the control of the Towed Body 78 and Receiving Aperture 34R through a serpentine flight path to generate Doppler nulls and the subsequent use of Doppler emitter location algorithms.

The use of a Towed Body Aperture 76 will allow the baseline length of a Receiving Aperture 34R to be increased from a typical 2 to 20, as in the prior art wherein Receiving Elements 36 are mounted on the Platform 82, to, for example, 200 to 1000 feet or more, depending upon the speed and altitude of the Platform 82. Such an increase in the length of the aperture baseline may provide an improvement in the angular discrimination of the aperture of 10 to 50 times that achievable in the prior art, and an extension of the frequency range of the Receiving Aperture 34R from the typical lower limit of approximately 30 MHz to 1 MHz or lower. The use of a Towed Body Aperture 76 also allows the creation of vertically oriented Receiving Apertures 34R having a vertical baseline of, for example, 100 feet or more. The generation of a vertically oriented aperture, for example, allows the range to an emitter to be determined by determining the point at which the measured vertical angle of a vector to the emitter intersects the surface.

C. Further Embodiments of an Emitter Location System (ELS) 10 (FIGS. 12 and 13)

Figure 12:
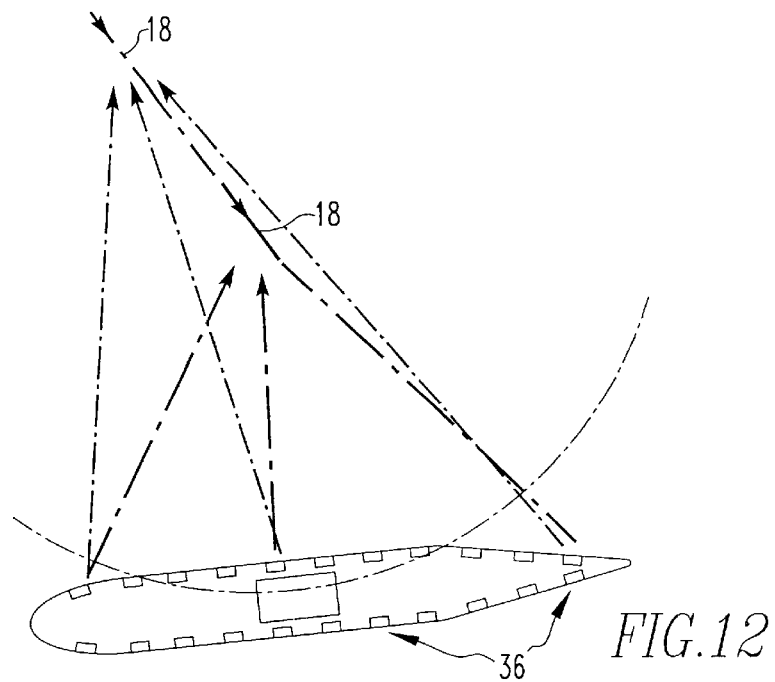
FIGS. 12 and 13 are illustrative diagrams of alternate implementations of an emitter location system of the present invention.
Figure 13:
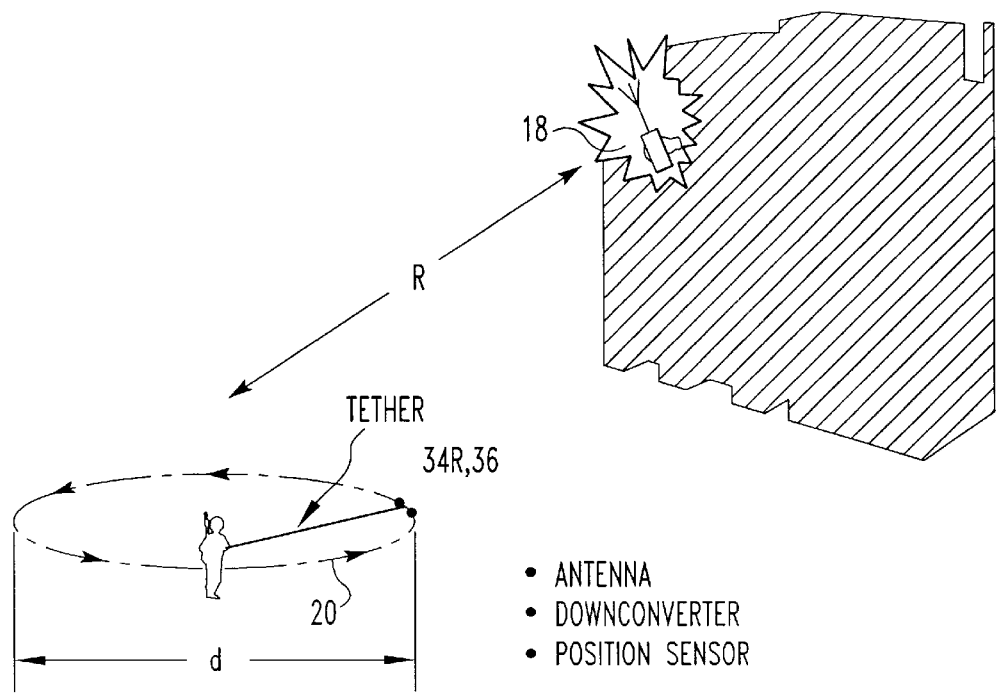

Referring finally to FIGS. 12 and 13, therein are illustrated two additional possible embodiments of the present invention in illustration of the flexibility and possible applications of the present invention.

FIG. 12 illustrates the implementation of a Measurement Aperture 34M as a very large aperture array mounted along the sides of a ship to locate, for example, a transmitter on an aircraft or other ship or, as illustrated in FIG. 12, a target seeking transmitter on a missile. In this regard, it will be appreciated that an emitter location system of the present invention is completely passive, so that the platform, that is, ship, does not reveal its presence or location in hazardous situations, and the use of the emitter location system does not interfere with other communications or search systems. It is estimates that an emitter location system designed, for example, to locate a target seeking transmitter of a missile, is capable of locating the missile to within 15 meters at a range of 25 km and of determining the speed of the missile to within 40 knots at that range with a 1 second signal integration time, providing a performance an order of magnitude greater than conventional passive ranging systems. It will also be recognized that a similar emitter location system may be employed, for example and for similar purposes and to similar advantages, as an array of sonar transducers mounted along the sides of a submarine. It will be understood with respect to the implementation of the present invention in sonar or other acoustic applications that while the system will operate according to the same principles and will contain essentially the same elements and will execute the same operations and functions, the data rate of the system will be adapted to the information rate of acoustic signals. Such adaptations will be apparent to those of ordinary skill in the relevant arts and will include, for example, the use of synthetic array techniques to increase the size of the measurement aperture in accordance with the wavelengths of acoustic signals.

Referring to FIG. 13, therein is illustrated an adaptation of the emitter location system of the present invention to a hand-held, backpack system usable by a single individual. As illustrated therein, Receiving Aperture 34R is comprised of a single, omni-directional Receiving Element 36 which moves along a Path 20 defined by a tether between the individual and the Receiving Element 36, so that Measurement Aperture 34M is comprised of a circle or arc of a circle generally centered on the user and having a radius defined by the length of the tether. It will be appreciated that an embodiment of the present invention as illustrated in FIG. 13 would find application and would be advantageous in, for example, search and rescue operations as well as a range of police and military operations.

In conclusion, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims.

What is claimed is:

1. A method for determining the geographical location of a signal emitter, comprising the steps of:

coherently measuring a phase gradient of a signal emitted by the signal emitter at a plurality of measurement points across a measurement aperture, each phase gradient measurement including an amplitude and a phase gradient of the received signal at the measurement point, determining a vector for each measurement point by integrating the corresponding measured phase gradient wherein each vector has a direction from the measurement point to the signal emitter and an amplitude proportional to the received signal at the measurement point, determining a figure of merit for each possible location of the signal emitter by integrating each vector with respect to a propagation path between the measurement point of the vector and the possible location of the signal emitter, and determining the location of the signal emitter as the possible location of the signal emitter having the highest figure of merit.

2. The method for determining the geographical location of a signal emitter of claim 1, wherein:

the measurement aperture is generated by motion of a receiving aperture along the path, and the phase gradient measurements are taken continuously and incrementally at a sequence of measurement points across the measurement aperture.

3. The method for determining the geographical location of a signal emitter of claim 2, wherein:

each vector is determined by integration of the phase gradient measurements over a measurement period as the receiving aperture moves along a segment of the path and has a direction from the corresponding segment of the path to the location of the signal emitter.

4. The method for determining the geographical location of a signal emitter of claim 3, wherein:

the figure of merit for each possible location of the signal emitter is determined for each vector by integration of the vector over an arc length of the path segment over which the phase gradient measurements of the vector were taken and with respect to the propagation path between the path segment and the possible location of the signal emitter.

5. The method for determining the geographical location of a signal emitter of claim 2, whereby:

the incremental and continuous line integration of the measured phase gradient of the signal across the measurement aperture allows the effective reconstruction of a wavefront of the signal emitted by the signal emitter, the reconstruction of the wavefront including the curvature of the wavefront.

6. The method for determining the geographical location of a signal emitter of claim 2, wherein:

the receiving aperture is generated as a synthetic aperture by motion of at least two receiving elements along a segment of the path, and a phase gradient measurement is taken by continuous and incremental measurement of the signal received by the receiving elements during motion of the receiving elements across the receiving aperture.

7. The method for determining the geographical location of a signal emitter of claim 1, wherein the receiving aperture comprises:

an airborne platform, a towed body connected to and towed by the airborne platform and positional with respect to the airborne platform, and at least a first receiving element mounted on the airborne platform and a second receiving element mounted on the towed body.

8. An emitter location system for determining the geographical location of a signal emitter, comprising:

a receiving aperture, a receiver connected from the receiving aperture for determination of a phase gradient measurement at each of a sequence of measurement points across a measurement aperture defined by motion of the receiving aperture along a path, each phase gradient measurement including an amplitude of the received signal and a phase gradient of the received signal across the receiving aperture, a position information source for providing position information relating to the geographic location of each measurement point, a vector processor for integrating the phase gradient measurement of each measurement point for determining a corresponding vector for each measurement point, each vector having a direction from the corresponding measurement point to the signal emitter and an amplitude proportional to the received signal at the measurement point, a location processor for determining a propagation path between each measurement point and each of a plurality of possible geographic locations of the signal emitter and determining a figure of merit for each possible geographic location of the signal emitter, wherein each figure of merit is determined by integrating each vector with respect to a propagation path between the measurement point of the vector and the possible location of the signal emitter.

9. The emitter location system for determining the geographical location of a signal emitter of claim 8, wherein:

the receiving aperture is generated as a synthetic aperture by motion of at least two receiving elements along a segment of the path, and a phase gradient measurement is taken by continuous and incremental measurement of the signal received by the receiving elements during motion of the receiving elements along a segment of the path.

10. The emitter location system for determining the geographical location of a signal emitter of claim 8, wherein the receiving aperture comprises:

an airborne platform, a towed body connected to and towed by the airborne platform and positional with respect to the airborne platform, and at least a first receiving element mounted on the airborne platform and a second receiving element mounted on the towed body.

\* \* \* \* \*